(12) United States Patent
Sankavaram et al.

(10) Patent No.: US 10,026,241 B1
(45) Date of Patent: Jul. 17, 2018

(54) COMBUSTION ENGINE AIRFLOW MANAGEMENT SYSTEMS AND METHODS

(71) Applicant: GM GLOBAL TECHNOLOGY OPERATIONS LLC, Detroit, MI (US)

(72) Inventors: Chaitanya Sankavaram, Sterling Heights, MI (US); Shiming Duan, Ann Arbor, MI (US); Layne Wiggins, Dexter, MI (US)

(73) Assignee: GM GLOBAL TECHNOLOGIES OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/685,304

(22) Filed: Aug. 24, 2017

(51) Int. Cl.
*F02D 41/14* (2006.01)
*G07C 5/08* (2006.01)
*F02D 41/22* (2006.01)
*F02D 41/18* (2006.01)

(52) U.S. Cl.
CPC ........... *G07C 5/0808* (2013.01); *F02D 41/18* (2013.01); *F02D 41/222* (2013.01); *G07C 5/0841* (2013.01)

(58) Field of Classification Search
CPC ........ F02D 41/18; F02D 41/14; F02D 41/222; G07C 5/0808; G07C 5/0841; G06G 7/70; G06F 19/00
USPC .................................................. 701/29.1, 101
See application file for complete search history.

(56) References Cited

U.S. PATENT DOCUMENTS

| 6,701,282 | B2 | 3/2004 | Ting et al. | |
|---|---|---|---|---|
| 6,957,140 | B1 | 10/2005 | Bauerle et al. | |
| 2005/0187699 | A1 | 8/2005 | Stamm et al. | |
| 2008/0223335 | A1 | 9/2008 | Bauerle et al. | |
| 2009/0018751 | A1* | 1/2009 | Buckland | F02B 37/007 701/103 |
| 2018/0038294 | A1* | 2/2018 | Hakeem | F02D 41/0025 |

OTHER PUBLICATIONS

Garrick, Robert D., "Throttle Coking Measurement Development and Thickness Variation Analysis of Field Return Throttles," SAE Technical Paper Series, 2008-01-2416.

* cited by examiner

*Primary Examiner* — Tan Q Nguyen

(57) ABSTRACT

An engine airflow management system includes an inlet portion to receive ambient air and a mass airflow (MAF) sensor to sense mass flow rate of air passed through the inlet portion. The airflow management system includes a throttle body to selectively restrict airflow and a throttle position sensor (TPS) to sense an opening value of the throttle body. The airflow management system includes an intake manifold in fluid connection with the throttle body configured to direct airflow to a number of combustion cylinders. A manifold air pressure (MAP) sensor detects air pressure at the intake manifold. A controller is programmed to monitor signals from each of the MAF sensor, TPS, and the MAP sensor and generate a residual error value based on a difference between a model-based value and a corresponding monitored signal. A response action is based on a trend of at least two residual error values.

20 Claims, 12 Drawing Sheets

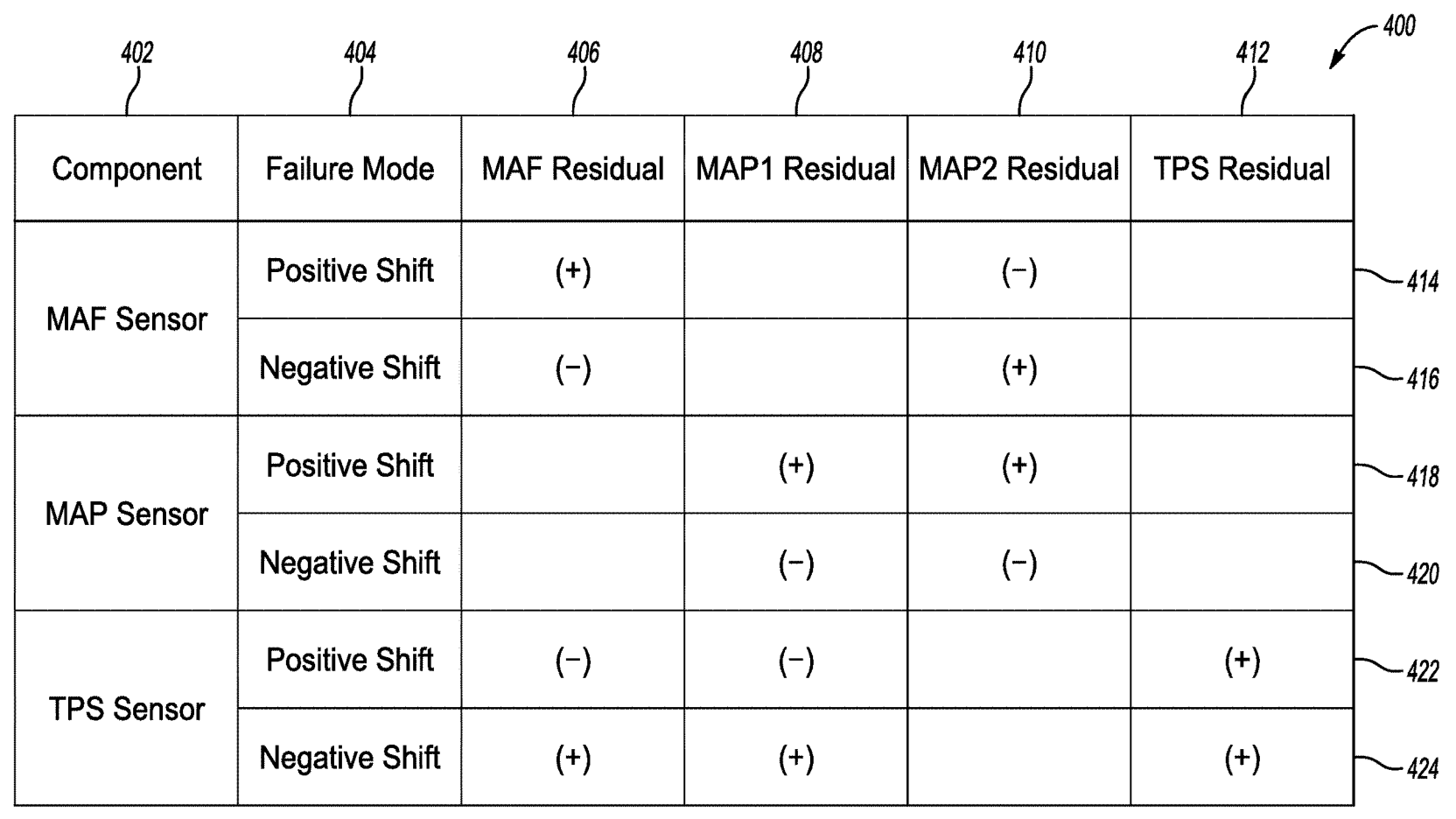

| Component | Failure Mode | MAF Residual | MAP1 Residual | MAP2 Residual | TPS Residual |
|---|---|---|---|---|---|
| MAF Sensor | Positive Shift | (+) | | (−) | |
| | Negative Shift | (−) | | (+) | |
| MAP Sensor | Positive Shift | | (+) | (+) | |
| | Negative Shift | (−) | (−) | (−) | |
| TPS Sensor | Positive Shift | (+) | (−) | | (+) |
| | Negative Shift | | (+) | | (+) |

Fig-4

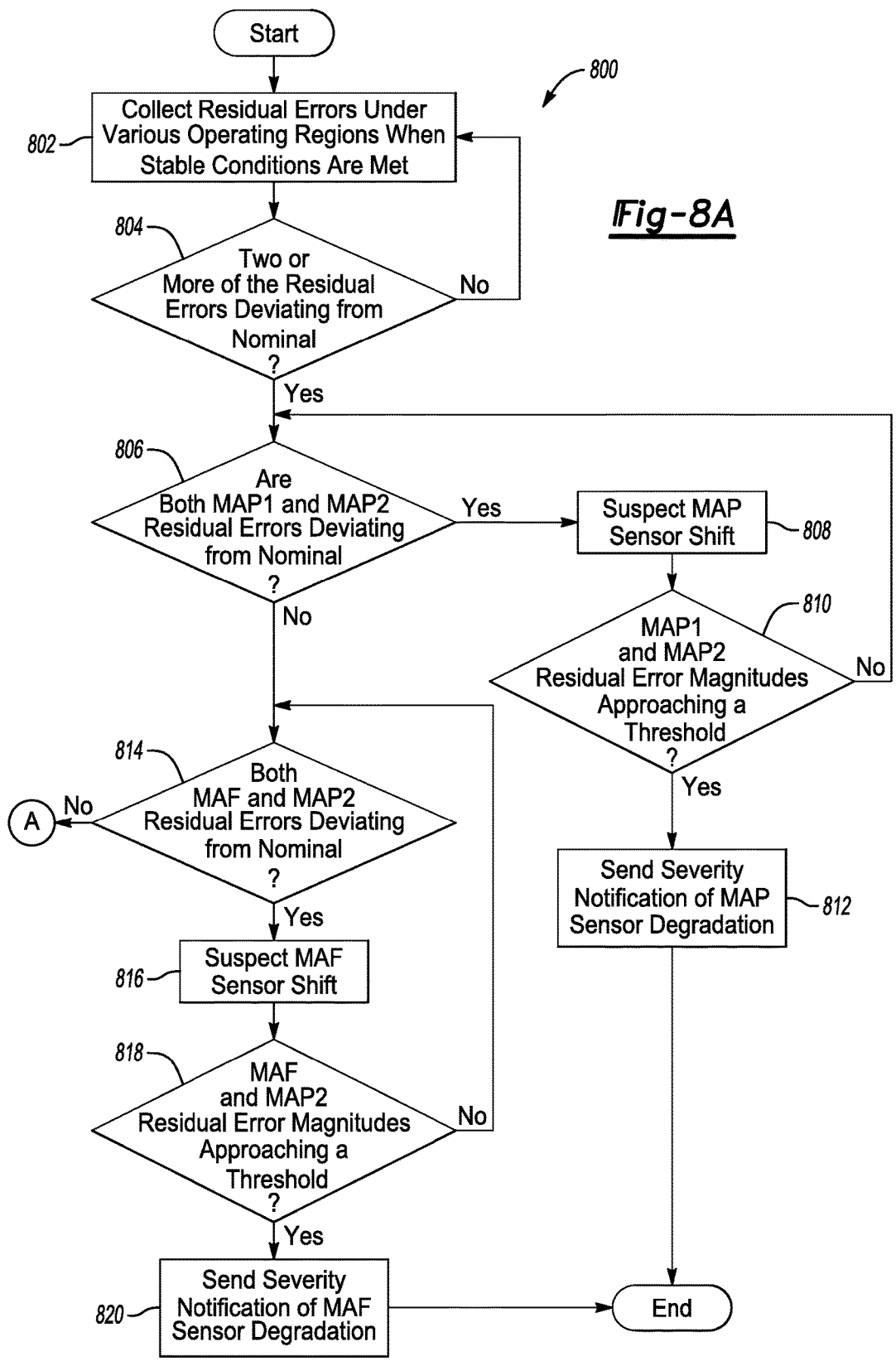

COMBUSTION ENGINE AIRFLOW MANAGEMENT SYSTEMS AND METHODS

TECHNICAL FIELD

The present disclosure relates to prognosis and diagnosis of an airflow management system.

INTRODUCTION

Certain controllers monitor sensor data associated with a corresponding vehicle system and may diagnose faults present in these sensors. Such a technique is reactive in nature and may be limited to present state conditions without estimating fault severity or predicting any degradation in the sensors. Thus such controller may be unable to forecast future state of health of the sensors and/or remaining useful life.

SUMMARY

An airflow management system for a combustion engine includes an inlet portion to receive ambient air and a mass airflow (MAF) sensor adapted to sense mass flow rate of air passed through the inlet portion. The airflow management system also includes a throttle body to selectively restrict airflow from the inlet portion and a throttle position sensor (TPS) adapted to sense an opening value of the throttle body. The airflow management system further includes an intake manifold in fluid connection with the throttle body and configured to direct airflow to each of a plurality of combustion cylinders and a manifold air pressure (MAP) sensor adapted to sense air pressure at the intake manifold. A controller is programmed to monitor signals from each of the MAF sensor, TPS, and the MAP sensor and generate a residual error value based on a difference between a model-based value and a corresponding monitored signal. The controller is also programmed to execute at least one response action based on a trend of at least two residual error values.

A method of conducting prognosis for an airflow management system for a combustion engine includes generating a first signal indicative of a mass flow rate of air passing through an inlet portion of the airflow management system. The method also includes providing a throttle body downstream of the inlet portion to restrict airflow through the airflow management system and generating a second signal indicative of a throttle body opening area. The method further includes providing an air intake manifold to distribute airflow from the throttle body to each of a plurality of combustion chambers and generating a third signal indicative of a manifold air pressure. The method further includes monitoring each of the first signal, second signal, and the third signal and generating a residual error value based on a difference between a model-based estimate and a corresponding monitored signal. The method further includes executing at least one response action based on a trend of at least two residual error values.

An engine airflow management system includes a mass airflow (MAF) sensor adapted to sense mass flow rate of air passing through an inlet portion, a throttle position sensor (TPS) adapted to sense an opening amount of a throttle body downstream of the inlet portion, and a manifold air pressure (MAP) sensor adapted to sense air pressure at an intake manifold downstream of the throttle body. A prognosis system for the engine airflow management system includes a controller programmed to receive signals from each of a group of sensors including at least the MAF sensor, TPS, and the MAP sensor and store in a memory at least one mathematical model to estimate performance values of one of the group of sensors based on signals received from the others of the group of sensors. The controller is also programmed to generate a residual error value based on a difference between the estimated performance value and a signal received from the one of the group of sensors and execute at least one response action based on a trend of the residual error value.

BRIEF DESCRIPTION OF THE DRAWINGS

FIG. 4 is a fault table associated with a plurality of sensor faults of an airflow management system.

FIG. 8A through FIG. 8B are a flowchart of a prognosis algorithm for an air management system.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
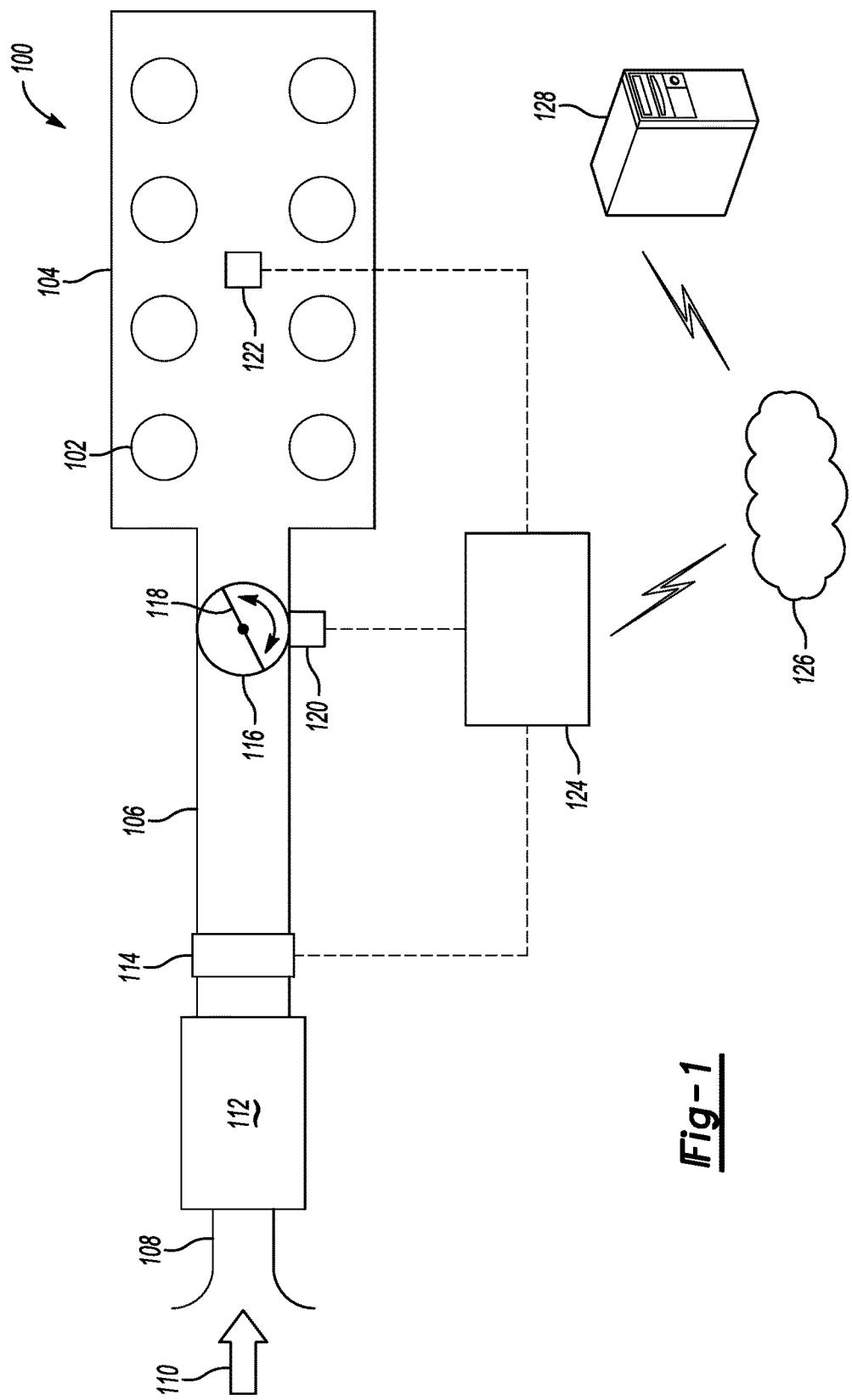
FIG. 1 is a schematic diagram of an airflow management system for a combustion engine.

Referring to FIG. 1, air management system 100 for an engine provides airflow to support combustion during engine operation. The engine includes a block having a number of combustion cylinders 102 within which a reciprocating cylinder cycles according to combustion cycle timing. The engine may be a gasoline engine, diesel engine, or any other type of engine requiring metered airflow to regulate combustion conditions. Air is fed to each of the cylinders 102 via an intake manifold 104 that includes a plurality of runners to route air to each cylinder. An air duct 106 is arranged to provide fresh air from the ambient environment to the engine as required. Air is taken in at an inlet 108 along direction 110. An air filter 112 may be provided to reduce particles and other contaminants in the airflow provided to the engine.

The air intake system 100 includes a plurality of sensors to collect data regarding various conditions of the airflow in order to optimize combustion. A Mass Air Flow Sensor (MAF) 114 is disposed near the air inlet portion and outputs a signal indicative of the mass flow rate of the air passing through the air duct 106. The air mass flow rate information is used to deliver the correct air mass to the engine corresponding to the fuel mass provided for combustion according to an engine output demand. Density of the intake air may vary as it expands and contracts with temperature and pressure. Thus the MAF 114 may also include an intake air temperature (IAT) sensor to provide thermal data as an input to make adjustments to compensate for such temperature changes. The output signal from the MAF sensor allow for accurate control of the air-fuel ratio of the engine.

The air intake system 100 also includes a throttle body 116 to regulate the amount of air passed from the inlet 108 to the intake manifold 104. The throttle body includes a variable position air control valve to vary the size of the airflow restriction and thus meter the amount of air passed to the intake manifold. In some examples the valve of the throttle body 116 is a butterfly valve having a rotating disk 118 which changes angular position between a first position substantially aligned with airflow along the duct (e.g., direction 110) and a second position substantially perpendicular to airflow along the duct. A throttle position sensor (TPS) 120 outputs a signal indicative of the angular position of the disk 118. While a butterfly type of valve is provided by way of example, other devices capable of regulating variable airflow corresponding to engine demands may also be suitable according to the present disclosure. The throttle body 116 may further include a throttle inlet air pressure (TIAP) sensor to output signals indicative of air pressure entering the throttle.

Based on the amount and conditions of the air passed to the intake manifold, air routed to cylinders 102 to support combustion may vary in pressure. Additionally, devices which force air such as turbocharger compressors may further influence the pressure of air passing through the air management system 100. A manifold absolute pressure sensor (MAP) 122 monitors air pressure at the intake portion of the manifold. According to some examples, the MAF sensor provides an open-loop signal for a controller 124 to predict airflow information, and the MAP 122 provides closed-loop feedback in order to make minor corrections to the predicted air mass by adjusting the position of the throttle body. Faults in the air intake system sensors may result in rough engine idling, engine hesitation, and poor fuel economy leading to a malfunction indicator flag and/or a reduced power engine mode. For example, some common failure modes include contamination or corrosion-related degradation due to aging, and sensor signal drift. According to aspects of the present disclosure, systematic diagnosis and prognosis methods are provided to detect and predict air management system sensor performance degradation.

A controller 124 is provided to monitor and control operation of the air management system 100. The controller 124 includes one or more digital computers each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 124 also stores a number of algorithms or computer executable instructions needed to issue commands to perform actions according to the present disclosure.

The controller is in communication with a number of sensors to receive data indicative of the performance of various vehicle components. The controller 124 receives signals from each of the MAF 114, the TPS 120, the MAP sensor 122. Also other sensors such as air temperature sensors and additional pressure sensors at various locations along the air management system 100 output signals to the controller 124. While each of the sensors is referred to in the singular, any number of sensors may be disposed at various locations to provide signals representative of the data discussed above as well as other data.

Various elements of the controller 124 may also be located off-board or outside of the vehicle, such as at a central processing location. More specifically, certain components and/or functions of the controller 124 may be located/performed onboard the vehicle, and other components and/or functions of the controller 124 may be located remotely from the vehicle, with data transmitted therebetween as necessary. In such cases, the controller 124 is also capable of wireless communication using an onboard transceiver. The transceiver is configured to exchange signals with a number of off-board components or systems. The controller 124 is further programmed to exchange information via a wireless communications network 126. Thus the controller 124 may be in wireless communication with an off-board server 128 that performs at least a portion of the processing described in the present disclosure. In other examples, the controller 124 periodically uploads measured data to the server 128, and the server stores aggregate data, performs data analysis, and generates prognosis messages. Utilization of an off-board server may help reduce on-board data processing and data storage requirements. The server may store one or more model-based computation algorithms discussed in more detail below to facilitate prognosis of the air management system.

The controller 124 may also store in a memory one or more algorithms representing mathematical models of various physical aspects of operation of the air management system 100. Such mathematical models of the operation of the air management system 100 may be used to predict system performance. Model-based assessments of system health may be performed using baseline mathematical models. That is, input signals received by the controller may be recognized to exemplify certain signature system behaviors associated with known failures such as component degradation or imminent failure. As mentioned above known failures associated with the air management system include but are not limited to for example, contamination, corrosion, and sensor signal drift.

In some examples parity equations are used to refine monitoring and control of the air management system. Model-based estimates of certain operating values are generated while the vehicle is operating using predetermined fixed parameters. The difference between measured outputs and the model-based estimate outputs should be close to zero under ideal conditions. In the case of a fault, the one or more process behaviors will differ from the model-based behavior since the models are structured to mimic fault-free cases. The deviations may be determined using transfer functions or using state-space formulations, for example. A particular set of residual deviation may be selected such that the deviation values are only influenced by particular fault types that are desired to be detected. The deviations may vary continuously based at least on fluctuations in output raw data and modeling error. To overcome the fluctuations and error, features of deviations are derived to remove noise influence as well as reduce the overall data burden. Depending on the difficulty of detecting a particular fault, the associated deviation may be calculated at a unique sample rate and/or have a unique sensitivity relative to other deviation types associated with different fault types. In some examples thresholds against which the deviations are compared may be adaptive thresholds. That is, a threshold may be automatically adjusted based on the character of the input data (e.g., rate of change of input data, direction of trend of input data, shape of change function of input data). Generally the arrangement of deviations is selected to make the deviations sensitive to faults and at the same time robust against disturbing effects.

Figure 2A:
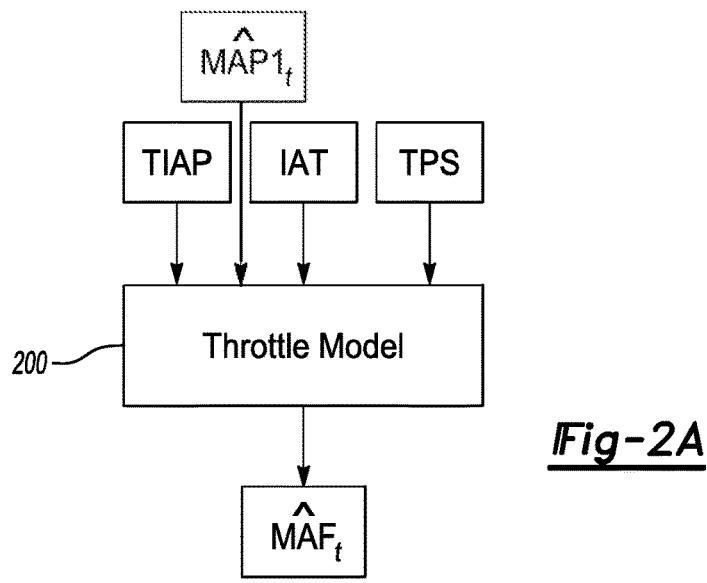
FIG. 2A through FIG. 2C illustrates a mathematical model for each of a plurality of sensor readings.
Figure 2B:
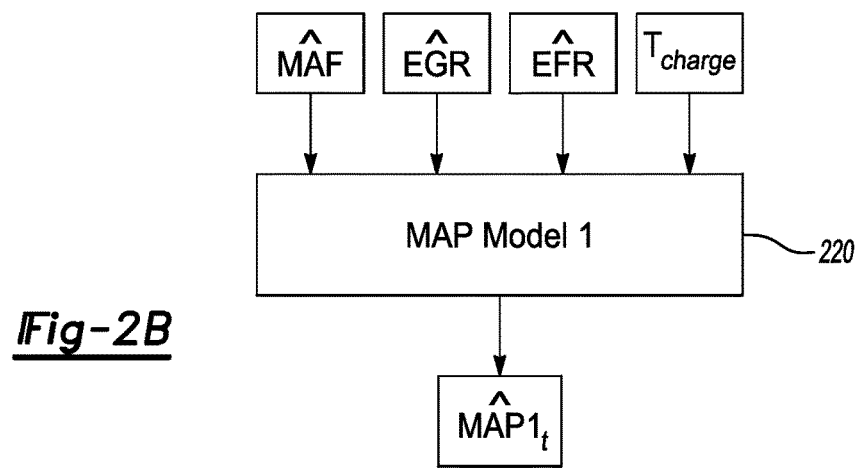
Figure 2C:
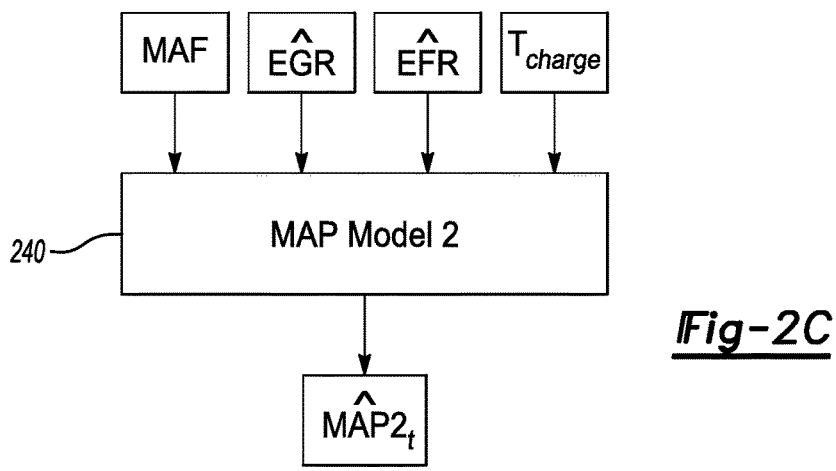

The controller may store in memory algorithms that include mathematical models for a number of different system attributes. Referring to FIG. 2, a throttle model 200 describes the flow through the throttle body and is used to estimate the mass airflow through the throttle body as a function of ambient air pressure, estimated MAP, throttle position, and intake air temperature. The throttle model is quasi-steady state and uses a first order lag filter to model dynamic airflow effects through the throttle body. The throttle model uses an effective flow area of the throttle body as a function of the signals output by the TPS, IAT sensor, and TIAP sensors.

Equation (1) below represents an example function to estimate mass airflow through the throttle.

$$M\hat{A}F_t = \frac{maflag * TIAP_t * \psi * A_{eff}}{\sqrt{R*(IAT+273.15)}} + (1-maflag)*M\hat{A}F_{t-1} \quad (1)$$

maflag represents the first order lag filter and may be varied within a range of 0 to 1 to control a weighting between the current parameters influencing the mass airflow estimate $M\hat{A}F_t$ and the preceding mass airflow estimate $M\hat{A}F_{t-1}$. $TIAP_t$ represents throttle inlet absolute pressure, R represents an ideal gas constant for air (e.g., about 287 m$^2$/(s$^2$*K). $A_{eff}$ represents effective open area of the throttle body based on the signal from the TPS. $\psi$ is a compressible flow function for air flowing through the air management system. $\psi$ may be at least in part dependent on pressure ratio across the throttle, Pr, where Pr is based on the throttle inlet pressure relative to the pressure at the manifold inlet pressure. According to some examples, $\psi$=0.685 for Pr<0.5283. For 0.5283≤Pr≤1.0, $\psi$ is defined by equation (2) below.

$$\psi = \sqrt{7*(Pr^{1.428}-Pr^{1.714})} \quad (2)$$

With continued reference to FIG. 2, a first intake manifold model 220 describes the intake manifold and is used to estimate MAP as a function of the mass flows into the manifold (from the throttle body and exhaust gas recirculation (EGR)) and the mass flows from the manifold caused by engine pumping. The intake manifold model is also quasi-steady state and accounts for manifold dynamics by integrating the effect of small step flow changes with time. The flow into the manifold from the throttle uses the estimate calculated from the throttle model. The engine flow model utilizes a model to determine volumetric efficiency and relies on the intake manifold model to properly account for the effect of altitude, cam phasing, and cylinder deactivation on volumetric efficiency.

Equation (3) below represents a first example function to determine MAP $$M\hat{A}P1_t = M\hat{A}P1_{t-1} + \left[\frac{\Delta t * T_{charge} * R*(M\hat{A}F_{t-1}+E\hat{G}R_t - E\hat{F}R_t)}{Vol_{intake}}\right] \quad (3)$$

$\Delta t$ represents a loop execution time (e.g., t≤0.1 sec). $Vol_{intake}$ represents intake manifold volume in cm$^3$ (e.g., as determined during vehicle calibration). $T_{charge}$ represents charge temperature and is included to account for the density of the air in the intake manifold as well as the effect of EGR flow on the temperature of the gas in the intake manifold. $E\hat{G}R_t$ represents EGR flow, and $E\hat{F}R_t$ represents engine flow rate.

With further reference to FIG. 2, a second intake manifold model 240 is similar to the first intake manifold model 220 which is described above, however the MAF sensor data is used directly in the model instead of the throttle model for the throttle air input. Equation (4) below represents a second example function to determine MAP.

$$M\hat{A}P2_t = M\hat{A}P2_{t-1} + \left[\frac{\Delta t * T_{charge} * R*(MAF_{t-1}+E\hat{G}R_t - E\hat{F}R_t)}{Vol_{intake}}\right] \quad (4)$$

As mentioned above, a preceding value of the MAF sensor $MAF_{t-1}$ is used in equation (4) as an input as compared to a calculated value $M\hat{A}F_{t-1}$ applied in the first example MAP function of equation (3).

Residual values for the modeled values of the air intake system are calculated based on differences between sensor independent estimates and the actual measured values. The modeled estimates of $M\hat{A}F$, $M\hat{A}P1$, and $M\hat{A}P2$ obtained from above described models are compared to actual measured values output from one or more sensors. The comparison generates three residual error values, a first residual error value, $MAF_{rt}$ corresponding to the MAF sensor signal from the throttle model is calculated according to equation (5) below.

$$MAF_{rt}=MAF-M\hat{A}F_t \quad (5)$$

A second residual error value, $MAP1_{rt}$, and a third residual error value, $MAP2_{rt}$, corresponding to MAP sensor signals from the first and second intake manifold models, respectively, are calculated according to equations (6) and (7) below.

$$MAP1_{rt}=MAP-M\hat{A}P1_t \quad (6)$$

$$MAP2_{rt}=MAP-M\hat{A}P2_t \quad (7)$$

A fourth residual error value, $TPS_{rt}$, corresponding to the TPS signal is generated by multiplying the first residual error of the MAF signal by the second residual error of the MAP signal according to equation (8) below.

$$TPS_{rt}=MAF_{rt}*MAP1_{rt} \quad (8)$$

Figure 3:
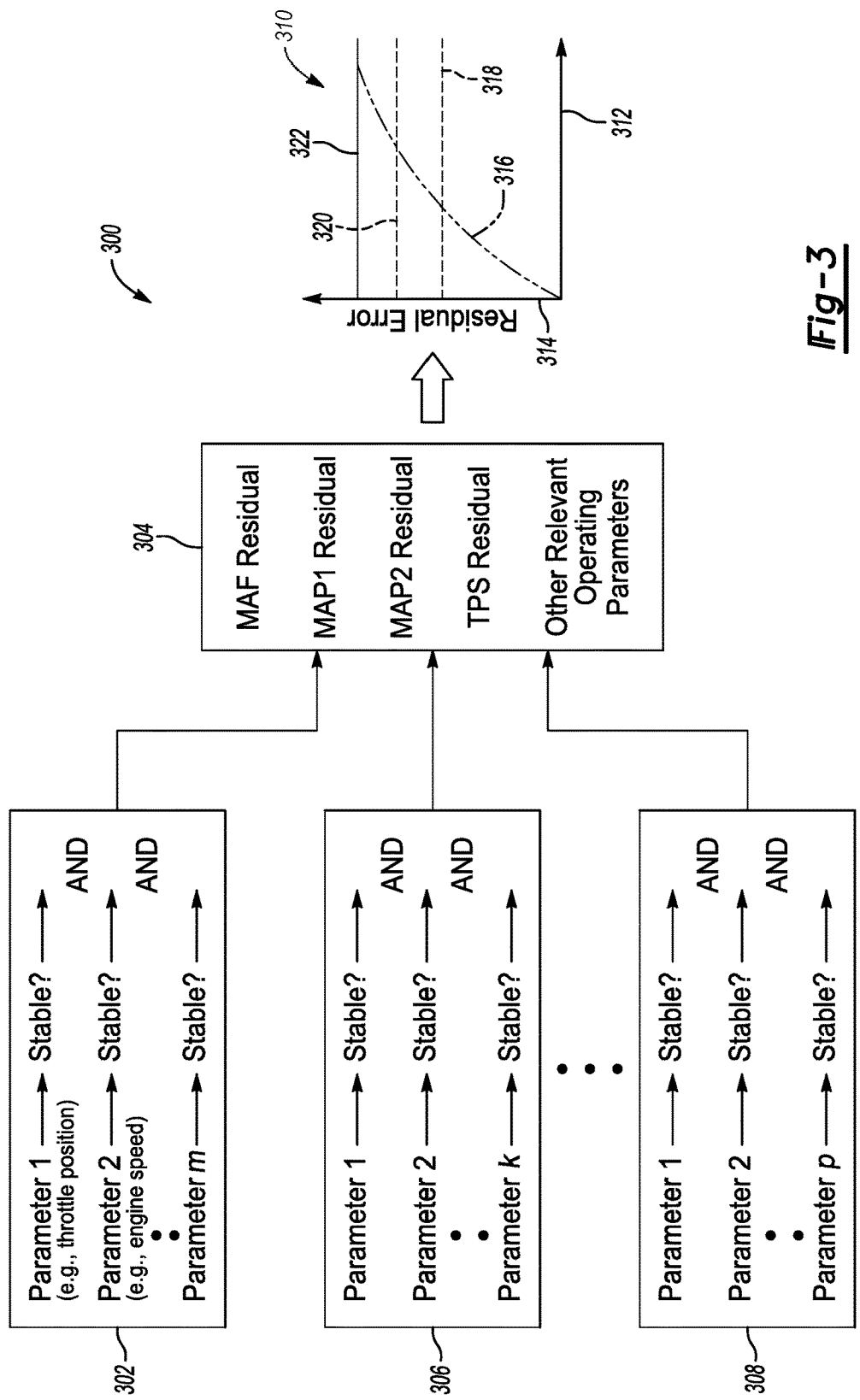
FIG. 3 is a schematic of an algorithm for calculating a plurality of residual error values.
Figure 5A:
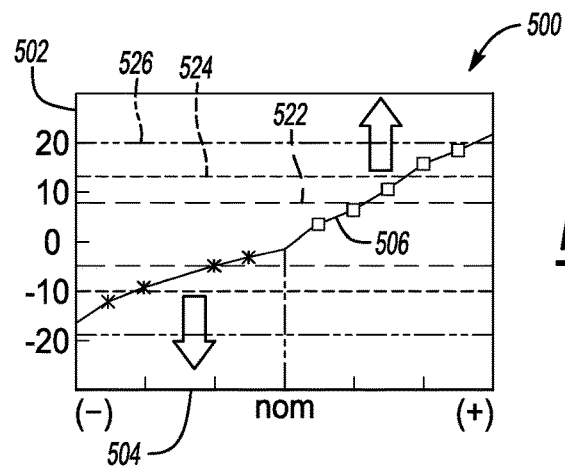
FIG. 5A through FIG. 5D are plots of sensor residual error values for a MAF sensor fault.
Figure 5B:
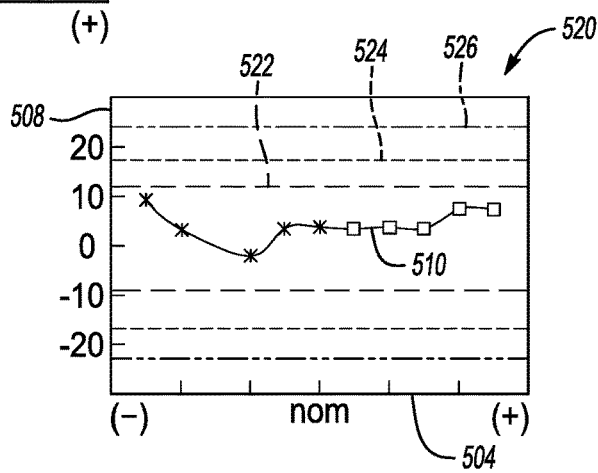
Figure 5C:
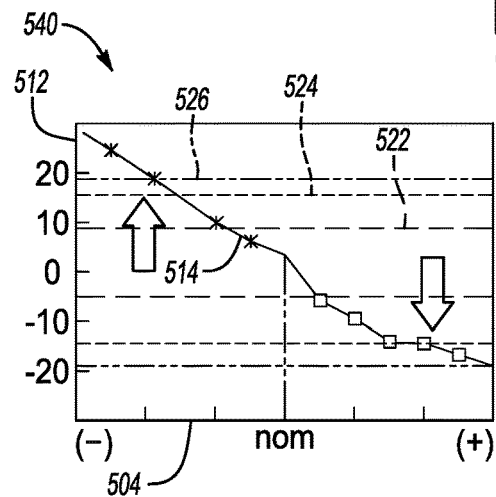
Figure 5D:
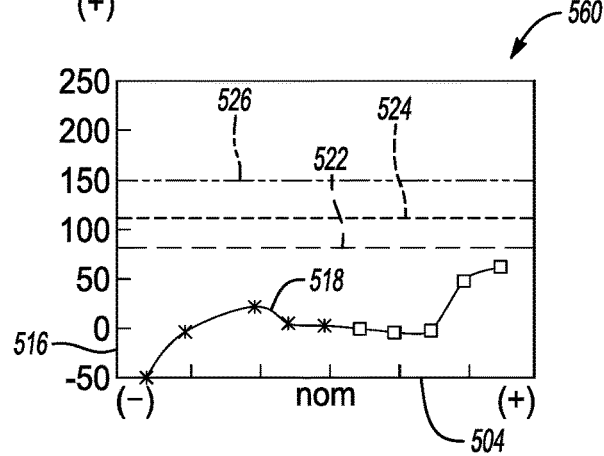
Figure 6A:
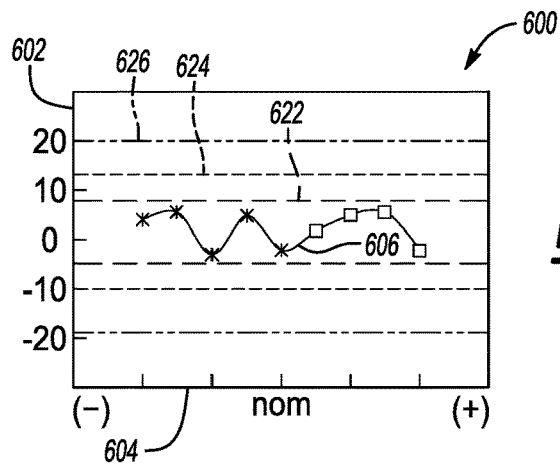
FIG. 6A through FIG. 6D are plots of sensor residual error values for a MAP sensor fault.
Figure 6B:
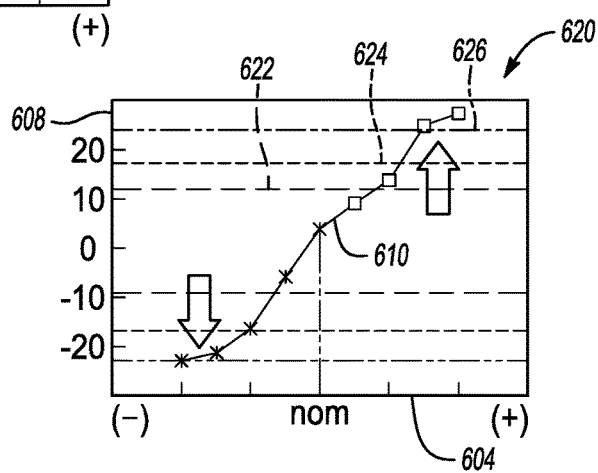
Figure 6C:
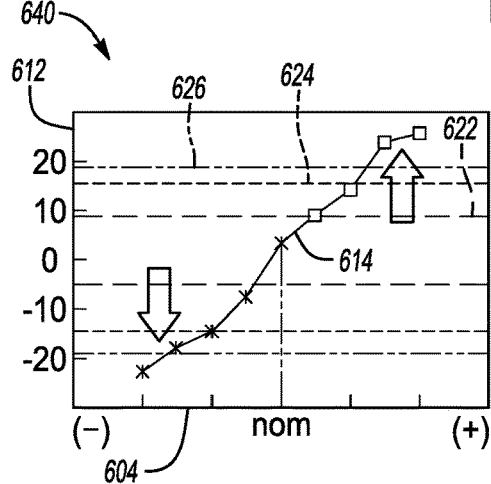
Figure 6D:
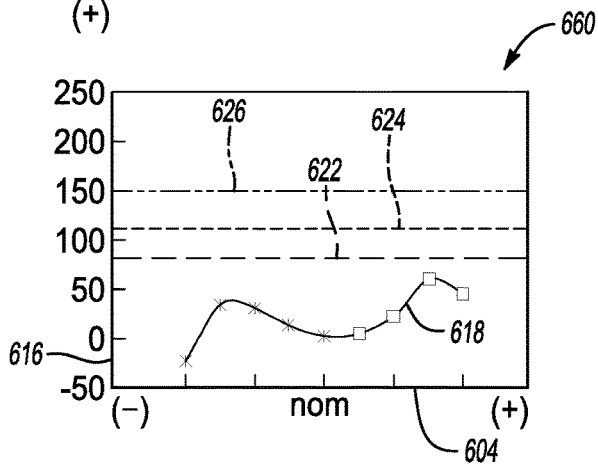
Figure 7A:
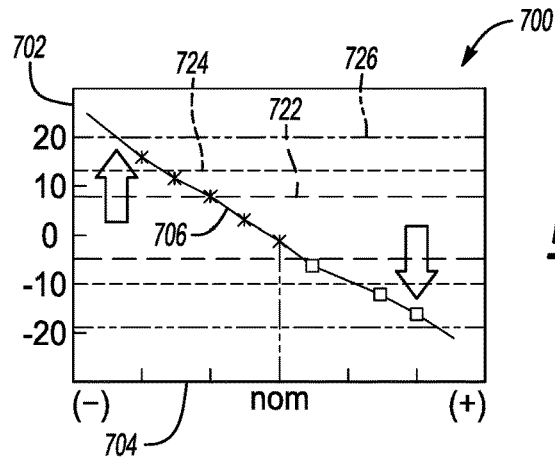
FIG. 7A through FIG. 7D are plots of sensor residual error values for a TPS fault.
Figure 7B:
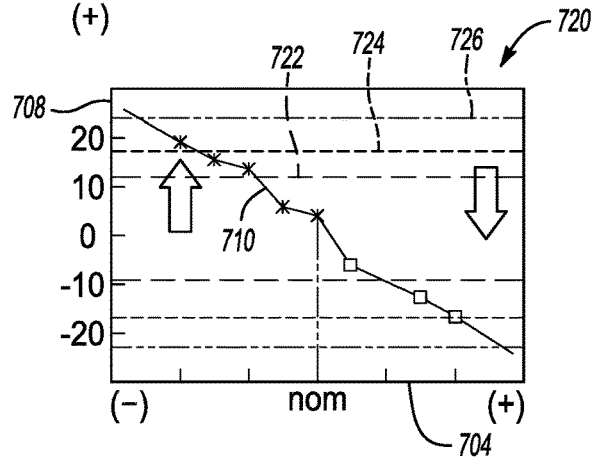
Figure 7C:
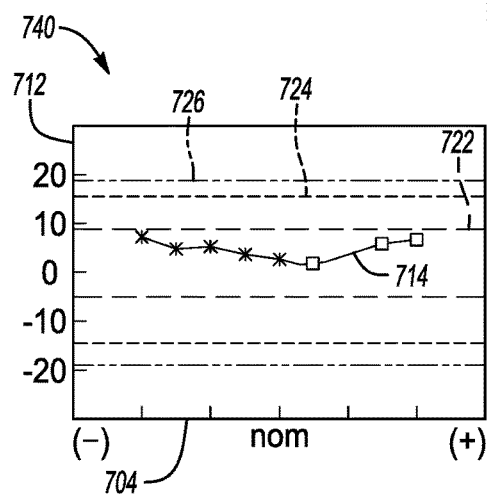
Figure 7D:
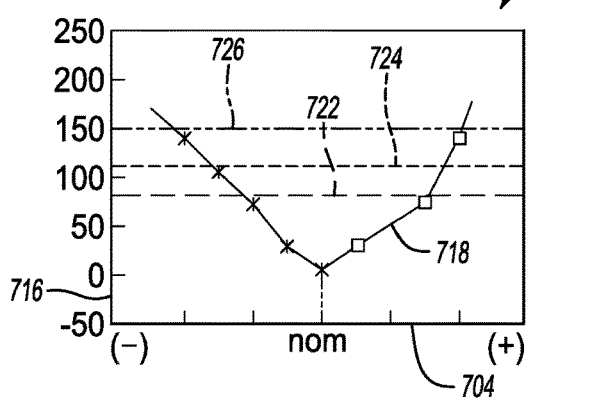

Based on the behavior of the residual error values, a state of health assessment of the air management system may be developed, as well as identification of particular types of sensor faults. The values are tracked over time and may be based on an amount of error related to signals output by one or more sensors. Referring to FIG. 3, a system 300 is provided to generate and store residual values associated with air management system each time stable operating conditions are detected (e.g., during each drive cycle). The residual values stemming from sensor signal error are tracked and stored in a memory for later use. The controller may be programmed to monitor at least one operating parameter that may signify the presence of a stable operating condition. In some examples stability may be characterized by variance less than a threshold range over a predetermined duration of time.

With continued reference to FIG. 3, operating region 302 may correspond to a particular set of stable conditions, represented by parameter 1 through parameter m. For example operating region 302 may represent cruising at a steady state speed. More particularly, parameter 1 may correspond to a throttle position, and parameter 2 may correspond to an engine speed. In some other examples, idle and/or coast-down conditions may exhibit sufficient stability to assess sensor error. The controller may be programmed to monitor other parameters up through parameter m, where the set of parameters collectively signify the presence of steady state cruising within operating region 302. According to the example of FIG. 3, each of the set of individually-monitored parameters must be stable for the operating condition to be considered stable. In some alternate examples, a subset of less than all of the monitored parameters may be suitable to deem the overall operating region as stable. The algorithm may be configured to monitor for a particular quantity of stable parameters at once. In further alternatives, the algorithm may be arranged to monitor for a predetermined list of particular parameters.

In response to detection of a stable operating condition, the controller is programmed calculate and store a plurality of residuals as discussed above. In the example of FIG. 3, each of the MAF residual, MAP1 residual, MAP2 residual, and TPS residual is calculated and stored in a measurement log 304. Raw data values for other operating parameters may also be stored in a memory along with the residual values.

The controller may be further programmed to monitor for different stable operating regions corresponding to other operating conditions. Referring to FIG. 3, controller is programmed to monitor parameter 1 through parameter k for the set of parameters characterizing stable conditions for operating region 306. Parameters 1 through k may be the same or different from parameters 1 through m of operating region 302. In one example operating region 306 corresponds to a second steady state cruising state during the same drive cycle. In other examples other stable operating conditions may correspond to different vehicle maneuvers or functions (e.g., idle while in park, idle while in drive, vehicle coast, etc.). A given set of monitored parameters for particular operating regions may include a distinct set of parameters relative to other different operating regions. During a given drive cycle, the controller may detect any number of operating regions based on the detection of the presence of stable parameter sets.

As discussed above, storage of the residual values and other relevant parameters is provided by a memory at the controller. These data may also be transmitted to an off-board server configured to store and process the data for state of health generation, aggregation of vehicle population data, and other monitoring functions.

According to aspects of the present disclosure, the air management algorithm is arranged to track the progression of residual errors for increase or decrease as a function of operating region. Over the course of time and a number of drive cycles, both the source of error and the direction of error may indicate degrading state of health for one or more particular sensors. As the residual error magnitudes approach the respective pre-defined thresholds for various fault severities, the progressive trends provide an early indication of a potential fault condition along with the fault intensity. The controller may store data corresponding to plot 310 for each of the tracked residual error values. Horizontal axis 312 represents drive cycles and vertical axis 314 represents a degree of error. Curve 316 represents an example residual value, plotted over time. In the example of plot 310, the residual increases in a positive direction as the sensor ages and error increases. Discussed in more detail below, a given sensor may also exhibit residual shifts in a negative direction depending on the sensor type and particular failure mode.

The air management algorithm may include storing any number of thresholds which are indicative of a degree of health relative to the plotted residual curve 316. Values less than a first threshold 318 may be indicative of nominal operating conditions where the sensor may be deemed fully healthy and the controller may take no responsive action. In response to the residual increasing to a range between the first threshold 318 and a second threshold 320, the sensor may be considered to exhibit low severity error. In this case the controller may issue a first prognosis message to provide an indication of the degraded sensor health. The first prognosis message may comprise a severity indicator and continue to be provided while the sensor operates within state of health range between threshold 318 and threshold 320. In at least one example, the prognosis message is transmitted to an off-board diagnostic server external to the vehicle.

The residual continues to increase the occurrence of certain combustion faults such as those discussed above may begin to increase in frequency and/or severity. If the residual 316 increases to greater than the second threshold 320, the controller may issue a warning message indicative of an imminent failure of the sensor. The imminent failure message may persist while the sensor operates within a state of health range between the second threshold 320 and a third threshold 322. The imminent failure message may operate as a different severity indicator and include an increased urgency relative to the first prognosis message. Additionally, the imminent failure message may have a different recipient group as compared to the first prognosis message.

If the residual increases to greater than the third threshold 322 the controller may determine that the sensor has failed based on the degree of increase of the residual error. In this case sensor performance may be degraded such that a message for need for urgent vehicle service may be provided to avoid powertrain shutdown related to faults in the air management system. A multi-tiered prognosis message system as described herein may provide different information about sensor health throughout different portions of useful life. Each of the various prognosis messages may operate as a severity indicator based on the operating conditions. Also the prognosis system may provide information to allow a vehicle owner to proactively obtain vehicle service prior to an actual vehicle break down.

Referring to FIG. 4, table 400 is a visual representation of a "reasoner" algorithm which analyzes combinations of symptom features to isolate particular air management sensor faults. The fault table 400 associates each of a plurality of combinations of fault signature components with a predetermined fault type. Column 402 represents a set of sensors to be monitored (e.g., MAF sensor, MAP sensor, TPS sensor, etc.). Column 404 identifies a set of sensor failure mode types relating to shifts in residual error. Each failure mode type may or may not include an outright sensor failure, but each fault signature is based on symptoms of degraded performance of particular sensors. Columns 406, 408, 410, and 412 represent residual error value trends for each of the MAF residual, MAP1 residual, MAP2 residual, and TPS residual, respectively. Rows 414, 416, 418, 420, 422, and 424 correspond to unique fault signatures that are indicative of particular sensor failure modes. Each fault signature includes a unique combination of residual error trends which is capable of indicating component degradation prior to a performance reduction being perceived by a driver. While six different failure mode types are provided by way of example, any number of faults may be predetermined and associated with a particular fault signature.

As discussed above, data for each of the residual error trends may be gathered on an ongoing basis during a vehicle drive cycle. Depending on the behavior of the values of each of the residual error values, certain trend combinations relate to fault signatures which indicate particular sensor shifts. Thus the unique signatures allow the controller to isolate particular sensor faults on a proactive basis prior to the fault being perceived by a driver. Residual error trends designated by "(+)" relate to a positive direction trend of the residual error. Likewise, residual error values designated by "(−)" relate to a negative direction trend of the residual error.

In a first example as depicted in row 414, a positive direction trend of the MAF residual error concurrent with a negative direction trend of the MAP2 residual error indicates a positive shift in output provided by the MAF sensor.

In a second example as depicted in row 416, a negative direction trend of the MAF residual error concurrent with a positive direction trend of the MAP2 residual error indicates a negative shift in output provided by the MAF sensor.

In a third example as depicted in row 418, a positive direction trend of the MAP1 residual error concurrent with a positive direction trend of the MAP2 residual error indicates a positive shift in output provided by the MAP sensor.

In a fourth example as depicted in row 420, a negative direction trend of the MAP1 residual error concurrent with a negative direction trend of the MAP2 residual error indicates a negative shift in output provided by the MAP sensor.

In a fifth example as depicted in row 422, a negative direction trend of the MAF residual error concurrent with a negative direction trend of the MAP1 residual error indicates a positive shift in output provided by the TPS sensor. And, as noted in an example above, the TPS residual value is based on a multiplication of the MAF residual and the MAP1 residual. Thus the TPS residual also exhibits a positive direction trend associated with the positive shift in the TPS sensor readings.

In a sixth example as depicted in row 424, a positive direction trend of the MAF residual error concurrent with a positive direction trend of the MAP1 residual error indicates a negative shift in output provided by the TPS sensor. Since the TPS residual value is based on a multiplication of the MAF residual and the MAP1 residual, the TPS residual also exhibits a positive direction trend associated with the negative shift in the TPS sensor readings.

Referring to FIG. 5A through FIG. 5D, a series of plots are provided to graphically depict residual error trends associated with a number of failure modes. Plot 500 provides MAF residual error along vertical axis 502. MAF sensor drift is shown along horizontal axis 504, where nominal readings having no faults are near the center, positive shifts to the right portion of the plot, and negative shifts toward the left portion of the plot. Curve 506 represents MAF residual error behavior in the presence of a MAF sensor shift. Plot 520 provides MAP1 residual error along vertical axis 508 and MAF sensor drift along horizontal axis 504. Curve 510 represents MAP1 residual error behavior in the presence of a MAF sensor shift. Plot 540 provides MAP2 residual error along vertical axis 512 and MAF sensor drift along horizontal axis 504. Curve 514 represents MAP2 residual error behavior in the presence of a MAF sensor shift. Plot 560 provides TPS residual error along vertical axis 516 and MAF sensor drift along horizontal axis 504. Curve 518 represents TPS residual error behavior in the presence of a MAF sensor shift.

It can been seen by a relative comparison of plots 500, 520, 540, and 560 that trend behavior of certain residual error values correspond to each other in the presence of certain MAF sensor shifts. For example, in the presence of a positive direction MAF sensor shift, the MAF residual 506 trends in an increasing direction, and the MAP2 residual 514 trends in a decreasing direction. At the same time, both of the MAP1 residual 510 and the TPS residual 518 remain within nominal operating ranges. These conditions generally correspond to failure mode of row 414 of the fault table 400 discussed above.

Conversely, in the presence of a negative direction MAF sensor shift, the MAF residual 506 trends in a decreasing direction, and the MAP2 residual 514 trends in an increasing direction. At the same time, both of the MAP1 residual 510 and the TPS residual 518 remain within nominal operating ranges. These conditions generally correspond to failure mode of row 416 of the fault table 400 discussed above.

According to some examples, a trend in a particular residual error value is recognized by the air management algorithm when the residual error value exceeds a predetermined severity threshold. Conversely, when residual error values of a particular monitored value remain within a predetermined range of normal operating thresholds, the monitored value is deemed to have a normal state of health and no prognosis message is generated. With continued reference to FIGS. 5A through 5D, a plurality of progressive severity thresholds are provided for each plot. A first set of thresholds 522 indicate when a residual error value exits a nominal operating range into a low severity failure mode state. In response, the algorithm may include issuing a corresponding low severity prognosis message indicating the sensor state of health degradation and reminding the user and/or service professional of an upcoming maintenance schedule. A second set of thresholds 524 is used to determine when the failure mode state worsens from the low severity state into a medium severity state. In response, the algorithm may include issuing a corresponding medium urgency prognosis message indicating the state of health degradation and illuminating a malfunction indicator light or other persistent warning message. When a residual error value exceeds a third set of thresholds 526, the algorithm includes determining that the failure mode is in a high urgency state including an imminent or present sensor failure. In response the algorithm may include engaging a limp home or other reduced engine operability modes to protect components from damage caused by any air management system fault conditions. The first set of thresholds 522, second set of thresholds 524, and third set of thresholds 526 may be set to a different error magnitude for each of the different monitored residual error values. Additionally, while the example ranges are presented as bound by a pair of thresholds symmetrically spaced about a zero nominal value, it should be appreciated that each of the various thresholds may be non-symmetrically spaced about a non-zero value.

Referring to FIG. 6A through FIG. 6D, a series of plots are provided to graphically depict residual error trends associated with a number of failure modes. Plot 600 provides MAF residual error along vertical axis 602. MAP sensor drift is shown along horizontal axis 604, where nominal readings having no faults are near the center, positive shifts to the right portion of the plot, and negative shifts toward the left portion of the plot. Curve 606 represents MAF residual error behavior in the presence of a MAP sensor shift. Plot 620 provides MAP1 residual error along vertical axis 608 and MAP sensor drift along horizontal axis 604. Curve 610 represents MAP1 residual error behavior in the presence of a MAP sensor shift. Plot 640 provides MAP2 residual error along vertical axis 612 and MAP sensor drift along horizontal axis 604. Curve 614 represents MAP2 residual error behavior in the presence of a MAP sensor shift. Plot 660 provides TPS residual error along vertical axis 616 and MAP sensor drift along horizontal axis 604. Curve 618 represents TPS residual error behavior in the presence of a MAP sensor shift.

It can been seen by a relative comparison of plots 600, 620, 640, and 660 that trend behavior of certain residual error values correspond to each other in the presence of MAP sensor shifts. For example, in the presence of a positive direction MAP sensor shift, the MAP1 residual error 610 trends in an increasing direction, and the MAP2 residual error 614 also trends in an increasing direction. At the same time, both of the MAF residual error 616 and the TPS residual error 618 remain within nominal operating ranges. These conditions generally correspond to failure mode of row 418 of the fault table 400 discussed above.

Conversely, in the presence of a negative direction MAP sensor shift, the MAP1 residual error 610 trends in a decreasing direction, and the MAP2 residual error 614 similarly trends in a decreasing direction. At the same time, both of the MAF residual error 606 and the TPS residual error 618 remain within nominal operating ranges. These conditions generally correspond to failure mode of row 420 of the fault table 400 discussed above.

Referring to FIG. 7A through FIG. 7D, a series of plots are provided to graphically depict residual error trends associated with a number of failure modes. Plot 700 provides MAF residual error along vertical axis 702. TPS sensor drift is shown along horizontal axis 704, where nominal readings having no faults are near the center, positive shifts to the right portion of the plot, and negative shifts toward the left portion of the plot. Curve 706 represents MAF residual error behavior in the presence of a TPS sensor shift. Plot 720 provides MAP1 residual error along vertical axis 708 and TPS sensor drift along horizontal axis 704. Curve 710 represents MAP1 residual error behavior in the presence of a TPS sensor shift. Plot 740 provides MAP2 residual error along vertical axis 712 and TPS sensor drift along horizontal axis 704. Curve 714 represents MAP2 residual error behavior in the presence of a TPS sensor shift. Plot 760 provides TPS residual error along vertical axis 716 and TPS sensor drift along horizontal axis 704. Curve 718 represents TPS residual error behavior in the presence of a TPS sensor shift.

Much like previous examples, it can been seen by a relative comparison of plots 700, 720, 740, and 760 that trend behavior of certain residual error values correspond to each other in the presence of TPS sensor shifts. For example, in the presence of a positive direction TPS sensor shift, the MAF residual 706 trends in a decreasing direction, and the MAP1 residual 710 also trends in a decreasing direction. Since the TPS residual value 718 is based on a multiplication of the MAF residual 706 times the MAP1 residual 710, the TPS residual 718 exhibits a positive direction trend as a result of a positive direction shift in TPS sensor readings. At the same time, MAP2 residual 714 remains within nominal operating ranges. These conditions generally correspond to failure mode of row 422 of the fault table 400 discussed above.

Conversely, in the presence of a negative direction shift of TPS sensor readings, the MAF residual 706 trends in an increasing direction, and the MAP1 residual 710 similarly trends in an increasing direction. And, since the TPS residual value 718 is based on a multiplication of the MAF residual 706 times the MAP1 residual 710, the TPS residual 718 also exhibits a positive direction trend as a result of a negative direction shift in TPS sensor readings. At the same time, the MAP2 residual 714 remains within nominal operating ranges. These conditions generally correspond to failure mode of row 424 of the fault table 400 discussed above.

Figure 8B:
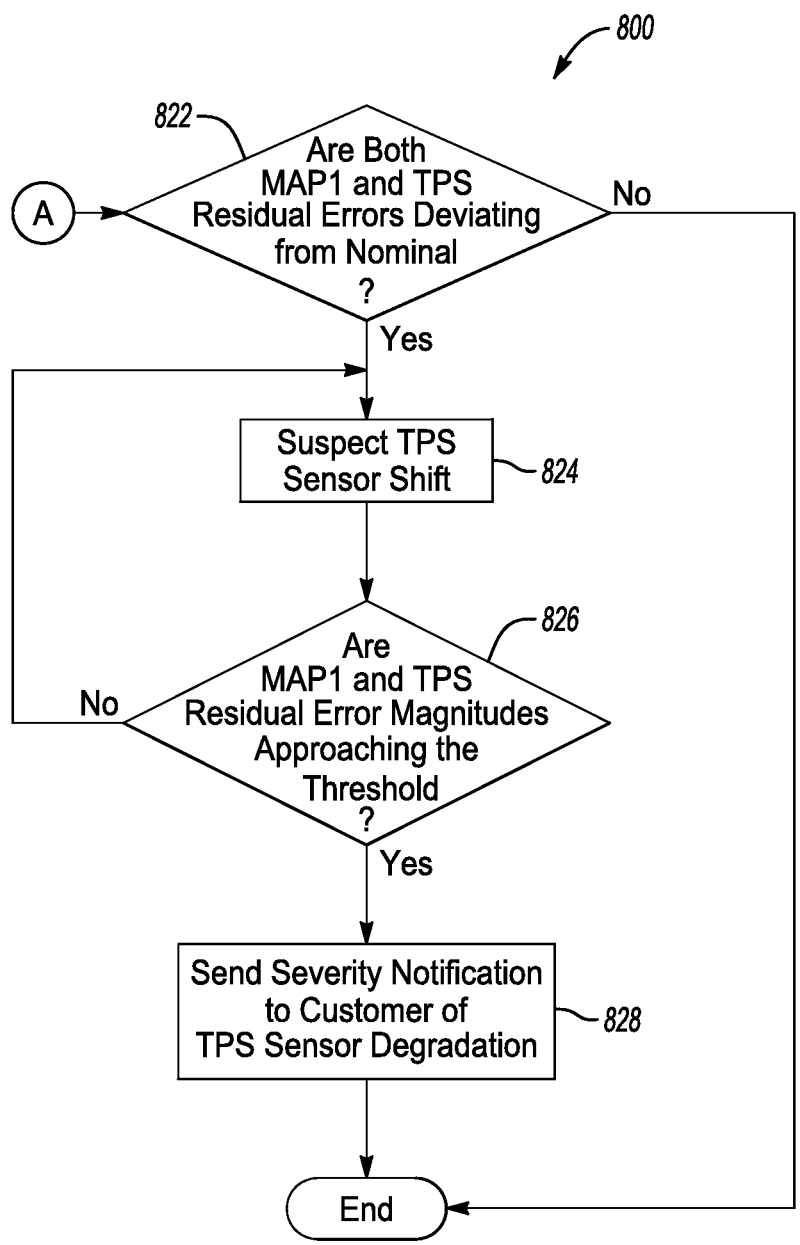

Referring to FIG. 8, method 800 depicts an algorithm for detecting shifts in air management system sensor data and conducting sensor health prognosis based on trends of residual values. At step 802 the algorithm includes collecting residual error data for a plurality of sensors of an air management system in response to the detection of stable operating conditions. As discussed above this may be performed a number of times over a single drive cycle, and/or across several different drive cycles. The sensors to be monitored may include at least a MAF sensor, a MAP sensor, and a TPS. Information from additional sensors which output data indicative of air conditions may also be monitored and correlated to sensor shifts and/or changing state of health.

At step 804 the algorithm includes detecting whether at least two sensor residual error values exhibit trends which deviate from nominal operating ranges. If at step 804 less than two sensor residuals exhibit such deviations, the algorithm includes returning to step 802 and continuing to monitor sensor residuals.

If at step 804 at least two residual error values exhibit trends that deviate from nominal ranges, the algorithm includes assessing which residual errors show trends and generating prognosis determinations based at least on the residual error types, directionality, and severity. At step 806, if both of the MAP1 and MAP2 residual error values exhibit deviation outside of a predetermined nominal operating range, the algorithm includes determining at step 808 that the MAP sensor may have a reading shift.

At step 810 the algorithm includes assessing the magnitude of the residual error trends. Specifically, the algorithm includes determining whether either of the MAP1 residual error or MAP2 residual error approaches a threshold value. As discussed above there may be a number of different thresholds arranged based on severity of the residual error values and the proximity of an imminent failure of one or more sensors. Depending on the notification scheme, step 812 may include generating and sending a severity notification indicative of a MAP sensor degradation. In some examples, such severity is sent for all residual errors outside of nominal operating ranges. In other examples, lower deviations are recorded and stored to monitor state of health performance, and notifications of sensor degradation only sent in response to residual error exceeding higher thresholds (e.g., medium severity or high severity thresholds).

If at step 806, both the MAP1 and MAP2 residuals are not deviating from nominal operating ranges, the algorithm includes at step 814 assessing whether both of the MAF residual and MAP residual deviate from nominal operating conditions. If both values exhibit sufficient deviation, the algorithm includes determining at step 816 that the MAF sensor may have a reading shift.

At step 818 the algorithm includes assessing the magnitude of the residual error trends. Specifically, the algorithm includes determining whether either of the MAF residual error or MAP2 residual error approaches a threshold value. As discussed above there may be a number of different thresholds arranged based on severity of the residual error values and the proximity of an imminent failure of one or more sensors. Depending on the notification scheme, step 820 may include generating and sending a severity notification indicative of a MAF sensor degradation.

If at step 814, both the MAF and MAP2 residuals are not deviating from nominal operating ranges, the algorithm includes at step 822 assessing whether both of the MAP1 residual and TPS residual deviate from nominal operating conditions. If both values exhibit sufficient deviation, the algorithm includes determining at step 824 that the TPS sensor may have a reading shift. As described above, the relationship between the TPS residual, MAF residual, and MAP1 residual is such that different combinations may be suitable to conduct prognosis for the TPS sensor. Specifically, either a MAF-TPS residual error combination, or a MAP1-TPS residual error combination may be sufficient to assess the state of health of the TPS sensor.

At step 826 the algorithm includes assessing the magnitude of the residual error trends. Specifically, the algorithm includes determining whether either of the MAP1 residual error or TPS residual error approaches a threshold value. As discussed above there may be a number of different thresholds arranged based on severity of the residual error values and the proximity of an imminent failure of one or more sensors. Depending on the notification scheme, step 828 may include generating and sending a severity notification indicative of a TPS sensor degradation.

According to further examples, combinations of residual error trends may be used to conduct prognosis for other components of the air management system. For example degradation and failure prediction of the throttle body butterfly valve may be detected based on behavior of the MAP residual, MAF residual, and/or TPS residual. Analysis of the residual values may allow for capturing throttle body deposit issues before they detract from engine performance. "Coking" may be caused by burned oil that deposits on surfaces and can lead to flow-restricted passages. Mixtures of soot and oil as part of the combustion process. If these deposits are significant enough, they can effectively choke off the airflow, causing engine hesitation and stalling. The engine control module is initially programmed with a nominal airflow versus throttle position table based on a new throttle. As deposits form in the throttle body, decreased airflow can cause problems if the engine control module does not correctly 'learn' new airflow properties relative to throttle position values. It may be desirable for the controller to relearn the amount of airflow through a restricted throttle and adapt to coking over time by accurately increasing the amount of bypass airflow.

As discussed above, airflow through the throttle body may be measured and estimated using various sensors. Based on the accumulated residual errors, the algorithm compensates for the variations in MAF sensor, TPS sensor, MAP sensor, and throttle body deposits such as coking. Symptoms associated with throttle body coking in particular can include reduced engine idle speed, and/or engine stall. In such cases there may not be direct diagnostic codes which correspond to contamination of the throttle body in order to invoke engine calibration changes in order to adjust and "relearn" idle conditions.

The air management system controller may be programmed to generate an airflow variation compensation (AVC) of the throttle body to alter a relationship between throttle position and open flow area. Such compensation may be provided to account for the accumulated residual errors. According to some examples, the AVC value is generated in response to a variance between an actual open area and a target open area of the throttle body valve. Compensation may be achieved by adjusting a throttle body valve position control signal, and the AVC value can be expressed as a percentage correction. In effect, the AVC adjustment compensates for airflow restrictions in the throttle body by changing an effective airflow area to obtain a desired opening. The AVC value as a percentage is calculated based on the accumulated MAF residual errors, which also may be a ratio between sensed error and estimated error. To minimize the MAF residual errors, the relationship between throttle position and the effective flow area may be adjusted such that the actual throttle area is more or less than the desired throttle area to achieve the desired air flow. The AVC value is then calculated based upon dividing the amount of compensation performed by the amount of total compensation allowed.

The degree of adjustment required and corresponding AVC value may provide an indication of throttle body deposits such as coking. According to some examples, an air management algorithm includes tracking a progression of airflow variation compensation and sensor residual errors over time (as a function of operating region). As the residual error magnitudes approach pre-defined thresholds (at various fault severities), the progressive trends provide an early warning to a potential throttle body coking condition.

Figure 9:
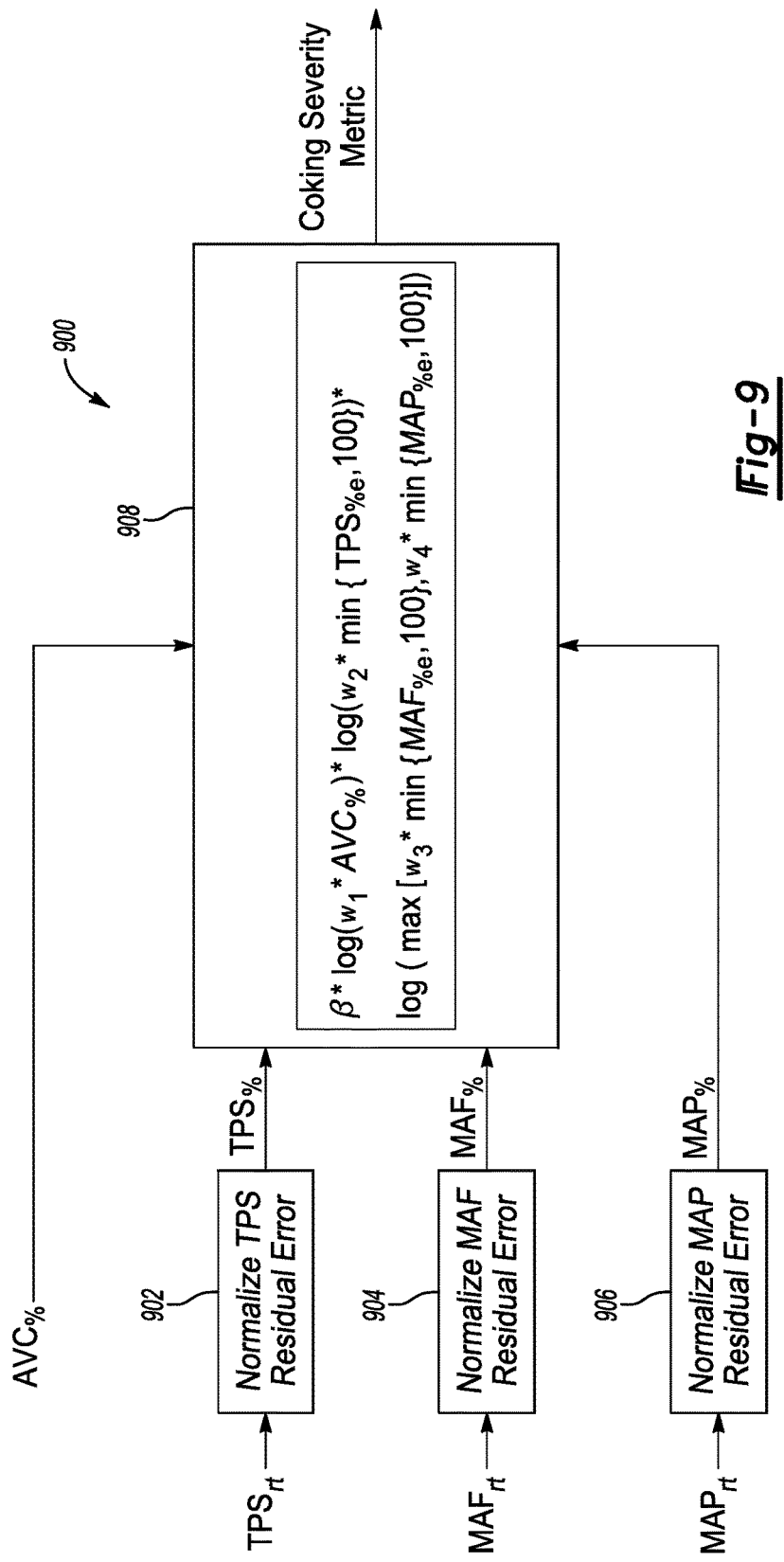
FIG. 9 is a schematic of an algorithm for calculating a throttle body coking severity metric.

Referring to FIG. 9, a schematic 900 depicts an algorithm for computing a severity metric for throttle body coking. Each of the values for TPS residual error, MAF residual error, and MAP residual error is converted to a normalized value.

According to at least one example, each residual is normalized to a percent error representation relative to data output representing a maximum error with respect to each respective sensor according to equations (9), (10), and (11) below.

$$TPS_\% = \frac{TPS_{rt}}{TPS \text{ residual maximum limit}} \quad (9)$$

$$MAF_\% = \frac{MAF_{rt}}{MAF \text{ residual maximum limit}} \quad (10)$$

$$MAP_\% = \frac{MAP_{rt}}{MAP \text{ residual maximum limit}} \quad (11)$$

With further reference to FIG. 9, the TPS residual error is normalized at 902, the MAF residual error is normalized at 904, and the MAP residual error is normalized at 906. Each of the normalized error values may be used along with the AVC value to calculate a throttle body coking severity metric at 908. Equation (12) below is an example equation used to compute the coking severity metric.

$$\text{Coking Severity} = \beta * \log(w_1 * AVC_\%) * \log(w_2 * \min\{TPS_\%, 100\}) * \log(\max[w_3 * \min\{MAF_\%, 100\}, w_4 * \min\{MAP_\%, 100\}]) \quad (12)$$

In equation (11) above, β represents a scaling factor, which may be used to normalize the overall coking severity value to be within a desired range. In some examples, β is based on the vehicle mileage and/or AVC value. Several weighting factors, $w_1$ $w_2$ $w_3$ and $w_4$ may be applied, respectively, to the normalized residual error values dependent on the desired sensitivity of the parameter for accurate coking detection. In some examples the overall coking severity metric ranges from between 0 and 100. Due to throttle body coking over time, the residual error values tend to grow as the vehicle ages.

Figure 10:
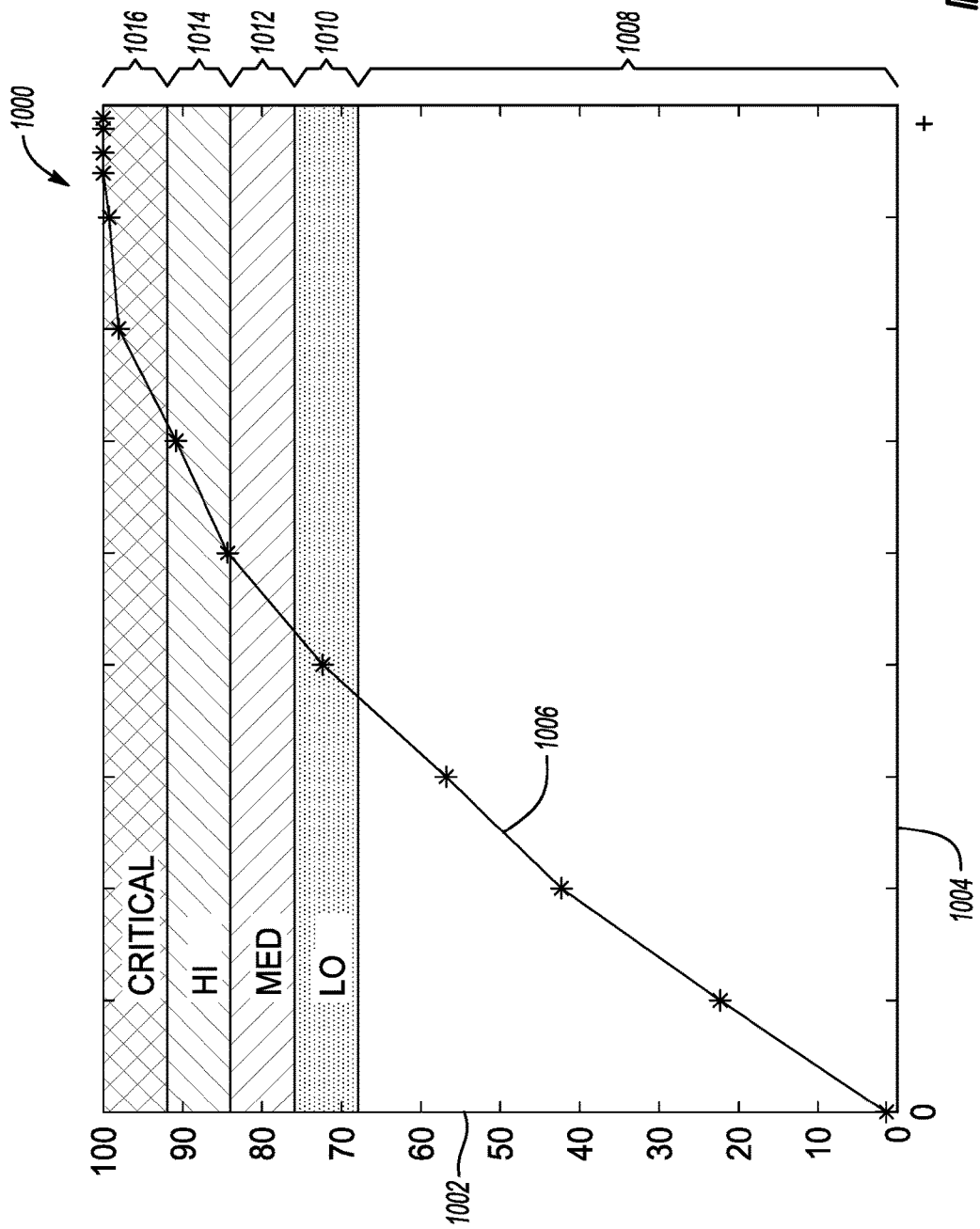
FIG. 10 is a plot of a throttle body coking severity metric over a number of drive cycles of a vehicle.

Referring to FIG. 10, plot 1000 represents an example progression of a coking severity metric over time. Vertical axis 1002 represents the value of a throttle body coking severity metric. Horizontal axis 1004 represents drive cycles of the vehicle where a zero cycle count is on the left portion of the plot, and the drive cycle count increases from the left portion toward the right portion of the plot. Curve 1006 represents the value of the coking severity metric which according to the example plot increases as a function of drive cycle count. A certain degree of throttle body coking is acceptable without adversely affecting operation of the air management system. However tracking the progression of the residual error values via the throttle body coking metric can help to predict the presence of throttle body coking.

A first operating range 1008 may include a range of values of the coking severity metric 1006 where operation of the air management system remains in an acceptable range and no action is taken in response to throttle body coking. A second operating range 1010 represents a low severity coking condition that may reflect the onset of accumulation of contaminants at the throttle body. An example response to coking severity metric values being within the second operating range 1010 may include uploading stored residual values and coking severity metric values to an off board server for further prognostic analysis and/or comparison to data corresponding to other vehicles such as within a common vehicle fleet for example.

A third operating range 1012 represents a moderate severity coking condition which may trigger an incrementally more urgent response action. For example, an algorithm may be configured to issue a first warning flag indicating a need to clean the throttle body if the vehicle is being serviced as part of a service schedule or repair of other vehicle components. More specifically, the coking severity metric may be integrated with the oil life monitor and/or other service schedules and routine maintenance checks. A passive service flag may be issued to inspect and service throttle body as a function of the value of the coking severity metric. In this way a service technician may receive an instruction to conduct throttle body cleaning as a preventative measure.

A fourth operating range 1014 represents a high severity coking condition which may trigger a further incrementally more urgent response action. For example a warning indicator in the vehicle may be activated or message sent to a user device indicating an active need for servicing of the throttle body. A state of heath value may similarly be issued to a user to provide an indication of a remaining operational life of the throttle body as it relates to coking conditions.

A fifth operating range 1016 represents a critical urgency coking condition which may trigger a highest degree response action. For example, an imminent failure service message may be provided to a user or vehicle service provider. Further, a control algorithm may include entering a reduced engine functionality mode (e.g., a low output "limp home" mode) in order to avoid or mitigate damage to the engine or air management system.

Figure 11:
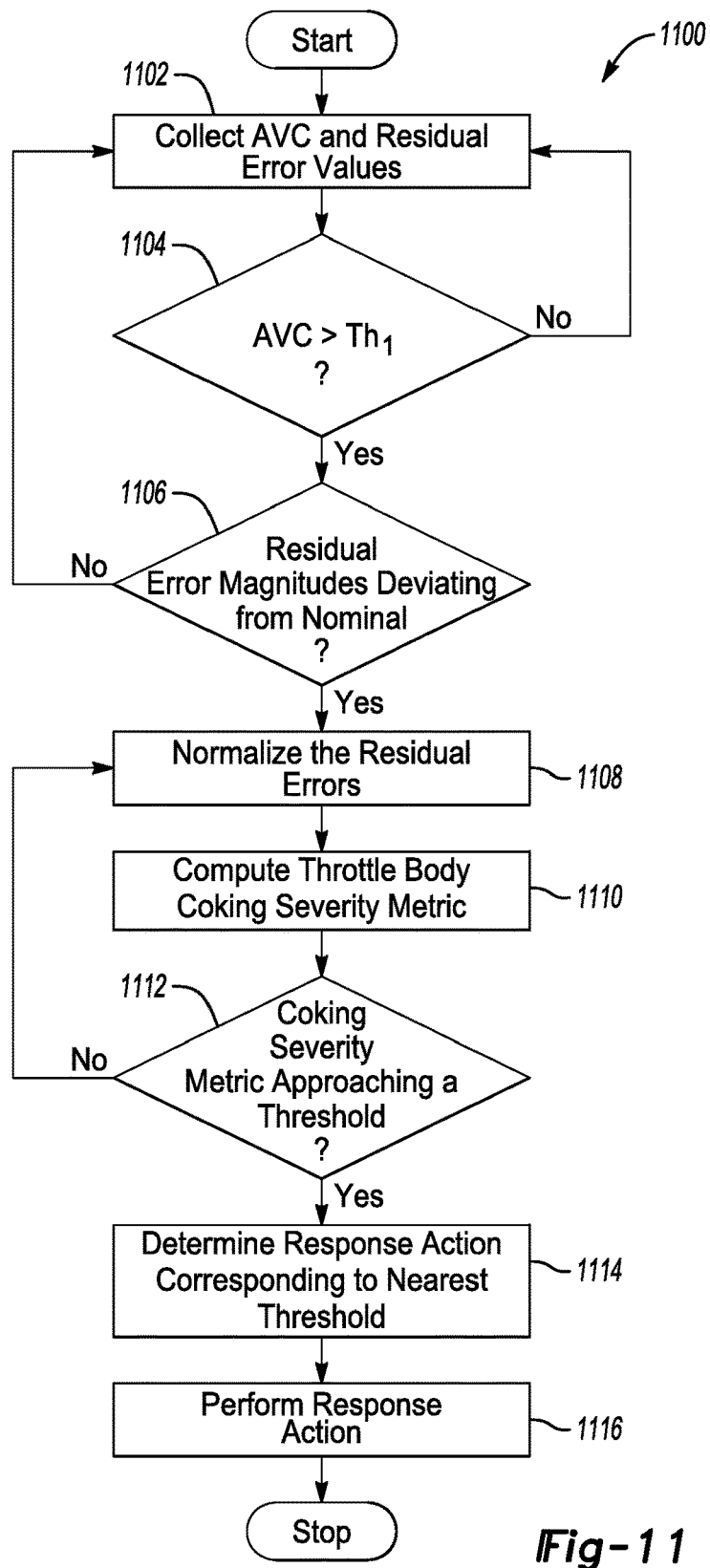
FIG. 11 is a flowchart of a prognosis algorithm for throttle body coking.

Referring to FIG. 11, method 1100 depicts an algorithm for conducting prognosis of a throttle body coking condition. At step 1102 the algorithm includes collecting AVC values and residual error values as discussed above under various vehicle operating conditions. If at step 1104 the AVC is less than a threshold $Th_1$ the algorithm remains in normal operation and continues to monitor AVC values and residual error values relating to the air management system.

If at step 1104 the AVC value is greater than the threshold $Th_1$, the algorithm includes assessing at step 1106 whether the residual error values deviate from nominal ranges. As discussed above, some examples include storing respective threshold values for a plurality of residual error values, and characterizing such threshold values as boundaries for nominal operation ranges. If at step 1106 the residual error values are within nominal ranges, it may indicate that the AVC value increase is due to a causal factor besides throttle body coking. Thus the algorithm includes returning to step 1102 and continuing to monitor AVC values and residual error values relating to the air management system.

If at step 1106 a number of residual error values are outside of nominal ranges, the algorithm includes entering a throttle body prognosis subroutine to assess the state of health relative to coking conditions. Step 1108 includes normalizing the error values as discussed above. At step 1110 the algorithm includes computing a throttle body coking metric value as a function of the AVC value and the residual error values.

Depending on the value of the coking severity metric relative to one or more threshold values, the algorithm includes preparing a response action. As discussed above there may be a plurality of severity thresholds stored corresponding to a number of different response actions. If no threshold is approached at step 1112, the algorithm includes returning to step 1108 and monitoring normalized residual error values and then re-calculating the coking severity metric.

If the coking severity metric value approaches a predefined threshold at step 1112, the algorithm includes associating the current operating conditions with the appropriate threshold and/or operating range, and then determining the corresponding response action. In some examples the response action corresponds with the nearest particular threshold. In other examples, the response action is based on the coking severity metric having a value within an operating range between two thresholds. Once the appropriate response action is determined at step 1114 the algorithm includes issuing a command to execute one or more response actions at step 1116.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The above description of variants is only illustrative of components, elements, acts, product and methods considered to be within the scope of the invention. The words used in the specification are words of description rather than limitation, and it is understood that various changes can be made without departing from the spirit and scope of the disclosure. As previously described, the features of various embodiments can be combined and rearranged to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An airflow management system for a combustion engine comprising:
    an inlet portion to receive ambient air;
    a mass airflow (MAF) sensor adapted to sense mass flow rate of air passed through the inlet portion;
    a throttle body to selectively restrict airflow from the inlet portion;
    a throttle position sensor (TPS) adapted to sense an opening value of the throttle body;
    an intake manifold in fluid connection with the throttle body and configured to direct airflow to each of a plurality of combustion cylinders;
    a manifold air pressure (MAP) sensor adapted to sense air pressure at the intake manifold; and
    a controller programmed to
        monitor signals from each of the MAF sensor, TPS, and the MAP sensor,
        generate at least one residual error value based on a difference between a model-based value and a corresponding monitored signal, and
        execute at least one response action based on a trend of at least two residual error values.

2. The airflow management system of claim 1 wherein the at least one response action includes generating a severity indicator based on at least one residual error value exceeding a predetermined severity threshold.

3. The airflow management system of claim 2 wherein the controller stores a plurality of progressive severity thresholds, and each of the thresholds corresponds to a unique set of response actions.

4. The airflow management system of claim 1 wherein the response action includes providing a fault signal associated with one of the MAF sensor, TPS, and the MAP sensor.

5. The airflow management system of claim 4 wherein the fault signal includes a prognosis message indicative of a state of health of at least one of the MAF sensor, TPS, and the MAP sensor.

6. The airflow management system of claim 1 wherein the response action includes causing a reduced operational state of the combustion engine in response to at least one residual error value exceeding a predetermined severity threshold.

7. The airflow management system of claim 1 wherein the controller generate a residual error value following a predetermined duration of stable engine operating conditions.

8. A method of conducting prognosis for an airflow management system for a combustion engine comprising:
    generating a first signal indicative of a mass flow rate of air passing through an inlet portion of the airflow management system;
    providing a throttle body downstream of the inlet portion to restrict airflow through the airflow management system;
    generating a second signal indicative of an opening area of the throttle body;
    providing an air intake manifold to distribute airflow from the throttle body to each of a plurality of combustion chambers;
    generating a third signal indicative of a manifold air pressure;
    monitoring each of the first signal, second signal, and the third signal;
    generating a residual error value based on a difference between a model-based estimate and a corresponding monitored signal; and
    executing at least one response action based on a trend of at least two a residual error values.

9. The method of claim 8 wherein the at least one response action includes generating a severity indicator based on at least one residual error value exceeding a predetermined severity threshold.

10. The method of claim 9 further comprising storing a plurality of progressive severity thresholds, wherein each of the thresholds corresponds to a unique set of response actions.

11. The method of claim 8 wherein the at least one response action includes providing a fault signal associated with at least one of a mass flow rate residual error, a throttle position residual error, and a manifold air pressure residual error.

12. The method of claim 11 wherein the fault signal includes a prognosis message indicative of a state of health of at least one of a mass airflow sensor, a throttle position sensor, and a manifold absolute pressure sensor.

13. The method of claim 11 wherein at least one of the first signal, the second signal, the third signal, and the fault signal is transmitted to an off-board server.

14. The method of claim 8 wherein generating the residual error value follows a predetermined duration of stable engine operating conditions.

15. A prognosis system for an engine airflow management system, the airflow management system having a mass airflow (MAF) sensor adapted to sense mass flow rate of air passing through an inlet portion, a throttle position sensor (TPS) adapted to sense a restriction amount of a throttle body downstream of the inlet portion, and a manifold air pressure (MAP) sensor adapted to sense air pressure at an intake manifold downstream of the throttle body, the prognosis system comprising:

a controller programmed to
- receive signals from each of a group of sensors including at least the MAF sensor, TPS, and the MAP sensor,
- store in a memory at least one mathematical model to estimate performance values of one of the group of sensors based on signals received from the others of the group of sensors,
- generate a residual error value based on a difference between the estimated performance value and a signal received from the one of the group of sensors, and
- execute at least one response action based on a trend of the residual error value.

16. The prognosis system of claim 15 wherein the controller is further programmed to generate a residual error value for each of the group of sensors and the at least one response action is based on a trend of at least two residual error values.

17. The prognosis system of claim 15 wherein the at least one response action includes generating a severity indicator based on at least one residual error value exceeding a predetermined severity threshold.

18. The prognosis system of claim 15 wherein the controller is further programmed to generate a prognosis message indicative of a state of health of at least one of the MAF sensor, TPS, and the MAP sensor.

19. The prognosis system of claim 18 wherein the prognosis message is indicative of a remaining operational life.

20. The prognosis system of claim 15 further comprising an off-board server programmed to conduct state of health assessments of the airflow management system, wherein the at least one response action includes transmitting the residual error value to the off-board server.

* * * * *